June 30, 1942.　　　U. ANESI　　　2,288,579
ROTARY MACHINE TOOL
Original Filed Sept. 5, 1939　　2 Sheets-Sheet 1
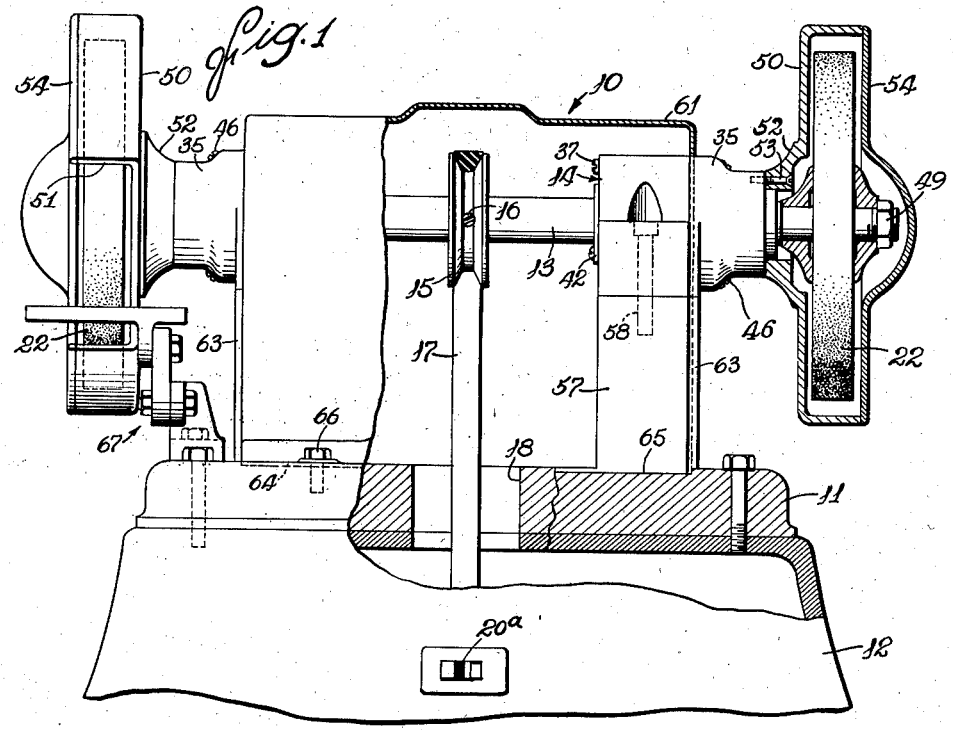
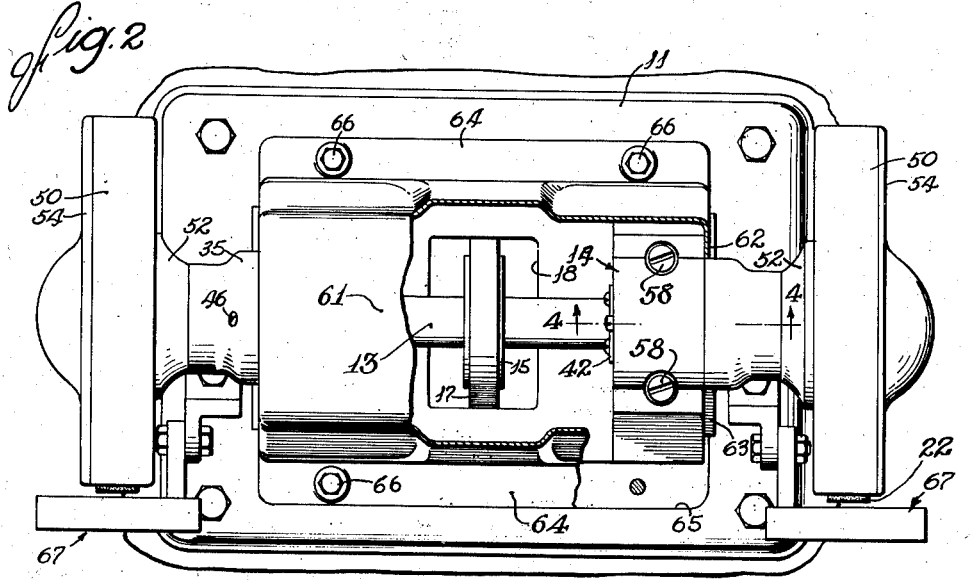
INVENTOR
Umberto Anesi
By: Parker, Carlson, Pitzner & Hubbard
ATTORNEYS June 30, 1942.  U. ANESI  2,288,579
ROTARY MACHINE TOOL
Original Filed Sept. 5, 1939  2 Sheets-Sheet 2
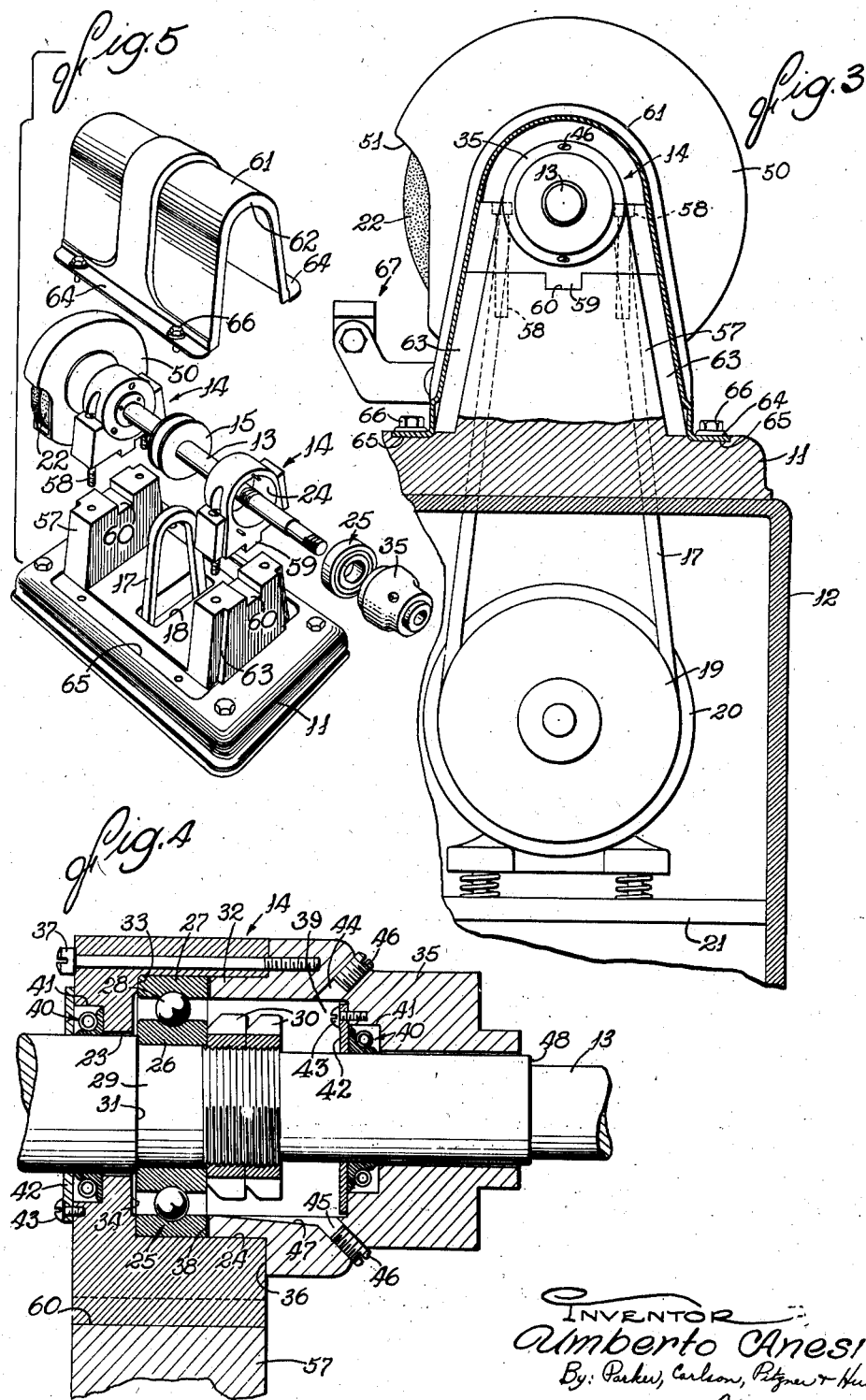
INVENTOR
Umberto Anesi
By: Parker, Carlson, Pitzner & Hubbard
ATTORNEYS Patented June 30, 1942

2,288,579

UNITED STATES PATENT OFFICE 2,288,579

ROTARY MACHINE TOOL

Umberto Anesi, Chicago, Ill.

Continuation of application Serial No. 293,512, September 5, 1939. This application February 27, 1940, Serial No. 321,006

5 Claims. (Cl. 51—166)

The present application is a continuation of my application Serial No. 293,512 filed September 5, 1939.

This invention relates to improvements in rotary machine tools and more particularly concerns a machine tool of this type suitable for use as a grinder, buffer or the like.

In rotary machine tools real benefits in smoothness of operation and freedom from vibration are obtained by the use of a preformed endless power transmission element or driving belt. However, such a transmission has not been employed as much as the advantages would seem to dictate in machines such as tool grinders where the tool shaft is supported by spaced bearings and may carry tools at both ends. In these machines the shaft is most often driven directly by the motor, and unsatisfactory attempts have been made to drive the shaft by means of a belt running over a pulley mounted between the bearings. In the latter cases considerable difficulty has attended replacement of the driving belt which has usually required coupling or lacing of the ends of the belt or, in the case of an endless belt, laborious removal and replacement of the tool shaft. With the coupled type of belt the vibrations set up by the coupling riding over the pulley at high speed tended to create an undesirable condition.

It is therefore an object of the present invention to provide a rotary machine tool adapted to be driven at high speed by an endless flexible driving member such as a belt and in which the tool head is mounted for quick and easy removal for changing the driving element, removal and replacement of the tool head being possible of accomplishment in a practical efficient manner merely by the use of the simplest sort of conventional tools and requiring exercise of only the rudimentary mechanical knowledge possessed by the ordinary machine worker.

Another object is to provide a removable-head machine tool of the foregoing general character in which the tool shaft is mounted in the tool head in an improved manner facilitating assembly and assuring smooth, vibrationless, practically wear-free operation thereof, by means of a novel bearing arrangement and connection for the shaft.

A further object of the invention is to provide a rotary machine tool which is characterized by valuable improvements and refinements in construction affording important economies in building the tool as well as in the operation thereof, and which is compact in arrangement and embodies only a small number of easily made parts but is capable of unusually long efficient service without requiring replacements.

An additional object is to provide a machine tool of this type in which the moving parts except the working portions of the tools are safely enclosed in a neat and attractive manner but can readily be exposed for access thereto when necessary.

Other objects and advantages of the invention will become apparent from the following detailed description taken in connection with the accompanying drawings in which:

Figure 1 is a side elevational view, partially in longitudinal section showing a machine tool embodying the principles of the invention.

Fig. 2 is a top plan view of the machine, with part of the closure hood broken away and in section to expose certain details of construction.

Fig. 3 is a fragmentary side elevational view of the machine, partially in section looking toward the right side of Fig. 1 and with the tool removed from the end of the shaft.

Fig. 4 is an enlarged fragmentary sectional detail view of the journal block and bearing assembly taken substantially along line 4—4 of Fig. 2.

Fig. 5 is an exploded assembly view of the machine.

In a preferred embodiment of a rotary machine tool according to the present invention, the tool shaft is supported by spaced bearings in the tool head and a transmission wheel element is carried by the shaft intermediate the bearings to have an endless flexible driving member run thereover from a similar transmission wheel element connected with a prime mover such as an electric motor. The tool head is removably mounted upon a base in such a manner that it can quickly be detached and lifted away for passing the endless driving member over an end thereof when it becomes necessary to change the driving member. The tool shaft is assembled and connected to the tool head in a novel manner by a bearing arrangement which greatly facilitates and simplifies the assembly of parts and enables changes to be made quickly and easily by the user of the machine. All of the movable parts of the machine are adapted to be completely enclosed by an improved cover arrangement. Many different kinds of rotary machine tool work can be performed with the present device and in practice it has been found particularly suitable for use as a high speed tool grinder, buffer, polisher, or the like, although it will be readily apparent it is equally suitable for other rotary machine tool operations.

Referring more particularly to the drawings, the invention is exemplified in a machine tool of the tool grinder type and includes a tool head 10 mounted upon a base or bed 11 which is carried, in the present instance, by a stand 12 although it is adapted to be secured upon other preferred forms of support such as a work bench.

The tool head 10 comprises a tool shaft 13 which is rotatably supported by preferably identical spaced journal blocks 14 and has secured thereto intermediate the journal blocks a transmission wheel element 15 which in the present instance is preferably a sheave type pulley secured to the shaft as by means of a set screw 16 and adapted to have an endless flexible driving member such as a V-belt 17 run thereover. To accommodate passage of the belt 17 therethrough the base 11 is formed with an opening 18 below the pulley 15, the belt running over a drive wheel or pulley 19 upon the shaft of a prime mover such as a spring mounted electric motor 20 (Fig. 3). The support for the motor may be a motor base or shelf 21 within the stand 12. Either the shelf or the motor or both may be adjustable relative to the tool head 10 for adjusting the tension of the driving belt 17 for efficient high speed operation. A switch operator 20ᵃ may be conveniently mounted upon the stand 12 for controlling operation of the motor. At either or both outer ends, the shaft 13 may carry replaceable rotary tools such as grinding wheels 22. As a result of the unbroken flexible nature of the driving belt 17 and the resilient mounting of the motor 20 the power transmission is practically vibrationless even at high tool shaft speeds, which in practice have run to about 3500 R. P. M.

An improved sealed bearing arrangement and connection for the tool shaft 13 with each of the journal blocks 14 facilitates assembly of the shaft and enables quick and easy replacement of the bearing. By reference to Fig. 4, showing the bearing arrangement in connection with one of the identical journal blocks 14, it will be seen that the shaft 13 extends through a bore 23 in the block and this bore is of slightly larger diameter than the shaft. A substantial concentric enlargement of the bore 23 forms an outwardly opening circular bearing chamber 24.

The shaft 13 is held against relative axial movement but permitted free rotational movement by means including an antifriction bearing 25 of the roller element type secured within the chamber 24. This bearing includes concentric inner and outer races 26 and 27 with interposed roller elements such as balls 28. The inner race 26 fits fairly snugly but slidably over a reduced-diameter section 29 of the tool shaft 13 lying inside of the bearing chamber 24. To secure the inner race 26 fixedly for rotation with the shaft 13, means such as lock nuts 30 threaded onto the shaft section 29 bears against the race to force it axially against a shoulder 31 formed at the juncture of the reduced and larger sections of the shaft. The outer race 27 is of a diameter to interfit slidably with the annular wall of the chamber 24 and is forced by means of a retaining flange 32 in the same axial direction as the inner race to engage stationarily against an outwardly projecting shoulder 33 formed on the inner wall or base of the chamber 24 preferably substantially coplanar with the shaft shoulder 31. By this form of connection for the bearing axial strain due to manufacturing inaccuracies is avoided and the races are securely held against sliding upon their seats. The offset inner portion of the inner or base wall is preferably recessed or offset from the shoulder 33, as indicated at 34, to afford clearance for unhampered rotation of the inner race 26 with the shaft 13.

The retaining flange 32 is formed as an axial annular projection upon a generally cup-shaped closure member or hub 35. To secure the hub in place it has an outer concentric rabbet groove seat 36 about the flange 32 to engage with the outer face of the journal block 14 about the mouth of the bearing chamber 24. In this position the hub is secured removably by suitable means such as bolts or screws 37 which herein pass through the journal blocks from the inside and are threaded into the hub at the groove seat 36. Preferably, manufacturing tolerances are accommodated by interposing a compressible fiber or other washer 38 between the retaining flange 32 and the outer race 27. Through this arrangement it will be evident that not only is the shaft 13 supported for smooth practically frictionless rotation but it is effectively held by the bearing 25 against axial movement or endplay relative to the journal member 14. Yet should it be necessary to remove the shaft 13 or replace the bearing 25, it is merely necessary to remove the screws 37, withdraw the hub 35, loosen the lock nuts 30 and slide out the bearing 25 (Figs. 3 and 4). This dismantling or the reassembly operation requires only the use of a screw driver and an ordinary wrench and can be effected by anyone having but a modicum of mechanical experience.

Lubricant such as oil for the bearing 25 may be sealed within the hollow interior of the hub 35 which for this purpose provides a lubricant chamber 39. The compressible gasket 38 assures a sealed joint between the outer bearing race 27 and the retaining flange 32. At the points where the shaft 13 passes through the bore 23 and through the outer end of the hub 35, suitable oil sealing means may be provided, in each instance herein comprising a sealing ring 40 fitting in an annular rabbet groove 41 and held in place by a retaining disk 42 which may be held in position by screws 43. The lubricant will thus be held against escape through any of the three possible points where leakage might occur.

To facilitate filling and draining of the lubricant chamber 39, a filling port 44 may be formed in the upper part of the hub 35 while a drain port 45 may be formed in the lower part of the hub. Suitable screw stopper plugs 46 may be provided to close the ports. To assure complete drainage of the lubricant chamber, an inclined drainage channel 47 may lead to the drainage port 45 from the retaining flange 32 at the bottom of the chamber. Thus, by sealing the bearing 25 in the presence of a constant lubricant supply wear is minimized and the danger of overheating during high speed operation is practically eliminated.

The grinding wheel 22 or other preferred rotary tool is secured to the outer end of the shaft 13 in any preferred manner as, for example, by keying the tool and shaft against relative rotation and securing the tool against a shoulder 48 upon the shaft by means of a nut 49 (Fig. 1). Since in a grinder it is desirable to enclose the grinding wheel 19, a guard 50 is provided which includes a working opening 51 and has a hub 52 secured as by means of screws 53 to the suitably fashioned outer end of the bearing chamber hub 35. To facilitate assembly of the tool 22 and the guard 50 the latter is equipped with a removable outer face plate 54.

An important feature of the invention resides in the means whereby the endless driving belt 17 can be changed by detaching the tool head 10 from the base 11. This eliminates the necessity for removing the tool shaft 13 from the tool head or disturbing the journal and bearing assembly or the lubricating arrangement for such purpose. In the present instance, the bed or base 11 is provided with a pair of standards 57 at opposite sides of the belt opening 18 and adapted to support the respective journal blocks 14. By preference the standards 15 are formed integral with the base 11 as a one piece casting, and are proportioned and located to extend from the base substantially inwardly spaced from the ends and sides of the latter. This spread of the base beyond the standards assures adequate, stable base area and provides substantial flanges for reception of means such as bolts for securing the base in place. A solid connection between the journal blocks and the standards may be provided by suitable means such as bolts 58, two of which may pass through suitable bores in each of the journal blocks, preferably at opposite sides of the bearing chamber 24, and are threaded into the tops of the respective standards.

To assure proper centering of the journal blocks 14 upon the standards and to relieve the bolts 58 of shearing strain, the journal blocks and standards may be formed with a complementary tongue and groove keyed interengagement (Fig. 3). In this instance the journal blocks 14 are formed with downwardly facing flat bearing surfaces including downwardly projecting central longitudinal keys or tongues 59 and the upper flat bearing faces of the standards 57 have complementary seats or grooves 60 to receive the tongues. As a result of this arrangement, when it becomes necessary to change the driving belt 17, it is merely necessary to release the belt from the motor shaft pulley 19, and detach the driving head 10 from the standards 57 by removing the bolts 58 (Fig. 5), whereupon the belt may be looped over either end of the driving head. Replacement is, of course, effected by reversal of these operations. This arrangement entirely avoids the disadvantages heretofore present in machine tools of this type where it was necessary either to remove the tool shaft from its bearings to effect a change of driving belts or, as was more commonly done, the driving belt was of the split variety necessitating a coupling. The endless type of driving belt obviously offers an important advantage in that during operation there is complete freedom from the vibration which the coupling of a spliced belt produces in the tool shaft.

As best seen in Figs. 1 and 2, the hubs 35 and the tool supporting ends of the shaft 13 are preferably of a length to support the tools 22 in substantially spaced relation to the adjacent faces of the journal blocks 14 and the standards 57. This spacing affords a good working clearance within which to manipulate a work piece such as may have a part that must extend between the adjacent journal block or standard and the tool while the piece is being worked upon.

In order to enclose the pulley and driving belt portion of the driving head, a hood 61 may be placed thereover. As shown in Figs. 1 and 2, this hood may be fashioned to engage at its opposite ends over the journal blocks 14 and with the sides of the standards 57. Inturned flanges 62 at the end edges of the hood may engage snugly within longitudinally alined grooves 63 at the outer corners of the journal blocks 14 and the standards 57. Outturned flanges 64 along the lower edges of the hood fit into recessed seats 65 in the upper face of the base 11, being secured therein as by means of bolts 66. The result is a neat appearing, smoothly interfitting enclosure for all moving parts of the machine except the working parts of the tools 22.

The base 11 may be so proportioned that it can support appropriate tool rests 67 adjacent to the working openings 51 for the tools 22.

From the foregoing it will be apparent that the present invention provides a substantially improved rotary machine tool adapted for varied uses which can be driven by means of an endless driving member that may easily be changed merely by removing the tool head of the machine and looping the driving member thereover. Moreover, the tool head is of novel construction assuring smooth, perfectly balanced, practically frictionless operation and freedom from wear. Bearing or tool shaft replacements can be effected simply and easily by the use of ordinary tools. All moving parts of the machine may be fully enclosed while in use and yet access can be had thereto quickly and without trouble.

While the invention is susceptible of various modifications and alternative constructions, I have shown in the drawings and have herein described in detail a preferred embodiment, but it is to be understood that I do not thereby intend to limit the invention to the specific form disclosed but intend to cover all modifications and alternative constructions falling within the spirit and scope of the invention as expressed in the appended claims.

I claim as my invention:

1. A rotary machine tool comprising, in combination, a base structure, a pair of spaced standards rising from said base structure, a tool head including a shaft having a transmission wheel at an intermediate point thereof to lie between said standards, journal members in support of said shaft at opposite sides of said wheel, means for removably connecting said journal members to said standards to enable detachment of the tool head and the looping thereover of a flexible transmission element adapted to engage the transmission wheel, and means for defining a predetermined centered relationship of said journal members and their respective standards.

2. A rotary machine tool comprising, in combination, a base structure including a pair of spaced upright standards, a tool head including means for engagement with said standards, tongue and groove key means for defining the assembled relationship of said engagement means and standards, and means for connecting said engagement means to said standards.

3. In combination in a rotary machine tool, a tool head, means for supporting said tool head, a rotary shaft carried by said tool head, means for supporting said shaft within said head for free rotary but non-axial motion including a concentric race type bearing having the inner race connected to said shaft and the outer race fitting within said tool head, means concentric with said shaft for connecting said outer race in place within said head, a tool carried by the outer end of said shaft, and a tool guard removably supported by said connecting means.

4. In combination in a rotary machine tool of the character described, a base, a pair of generally flat standards extending from said base in spaced parallel relation, a tool shaft, a pair of journal members rotatably supporting said shaft and carried by said standards, said journal members and the outer ends of said standards having opposed engagement faces including tongue and groove means extending generally in the direction of the shaft axis, and a single pair of bolts for securing each of the journal members in place, said bolts extending through the respective journal members into the ends of said standards one on each side of said shaft.

5. A rotary machine tool comprising, in combination, a base structure, a tool head including a shaft having a transmission wheel at an intermediate point thereof, journal members in support of said shaft at opposite sides of said wheel, means on said base structure for receiving and supporting said journal members, means for defining a predetermined centered relationship of said journal members and their respective supporting means, and means for removably connecting said journal members to said supporting means to enable detachment of the tool head and the looping thereover of a flexible transmission element adapted to engage the transmission wheel.

UMBERTO ANESI.